United States Patent
Hobbs et al.

(10) Patent No.: US 9,454,208 B2
(45) Date of Patent: Sep. 27, 2016

(54) PREVENTING SLEEP MODE FOR DEVICES BASED ON SENSOR INPUTS

(71) Applicant: Google Inc., Mountain View, CA (US)

(72) Inventors: Nicholas Kenneth Hobbs, San Francisco, CA (US); Alex Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 343 days.

(21) Appl. No.: 13/826,635

(22) Filed: Mar. 14, 2013

(65) Prior Publication Data

US 2014/0281617 A1    Sep. 18, 2014

(51) Int. Cl.
*G06F 1/32* (2006.01)

(52) U.S. Cl.
CPC .......... *G06F 1/3234* (2013.01); *G06F 1/3209* (2013.01)

(58) Field of Classification Search
CPC ..... G05D 23/1905; G06F 3/01; G06F 3/014; G06F 3/017; G06F 1/3234; G06F 1/3206
See application file for complete search history.

(56) References Cited

U.S. PATENT DOCUMENTS

| | | | |
|---|---|---|---|
| 6,493,652 B1 * | 12/2002 | Ohlenbusch | A61B 5/1038 324/160 |
| 8,255,724 B2 | 8/2012 | Das | |
| 8,295,217 B2 | 10/2012 | Kone et al. | |
| 8,869,095 B2 * | 10/2014 | Long et al. | 717/100 |
| 2003/0092493 A1 * | 5/2003 | Shimizu | A63F 13/00 463/43 |
| 2005/0084075 A1 | 4/2005 | Kotzin | |
| 2006/0025897 A1 * | 2/2006 | Shostak et al. | 701/1 |
| 2007/0195074 A1 * | 8/2007 | Gelissen | G06F 1/3228 345/204 |
| 2008/0062815 A1 * | 3/2008 | Iseli | 367/77 |
| 2008/0065290 A1 * | 3/2008 | Breed et al. | 701/29 |
| 2008/0161072 A1 * | 7/2008 | Lide et al. | 455/574 |
| 2008/0282100 A1 * | 11/2008 | Chen et al. | 713/322 |
| 2008/0290985 A1 | 11/2008 | Vogedes et al. | |
| 2010/0235667 A1 * | 9/2010 | Mucignat | G06F 1/3203 713/323 |
| 2011/0302401 A1 * | 12/2011 | Yokoyama et al. | 713/2 |
| 2012/0147531 A1 * | 6/2012 | Rabii | H04W 52/0254 361/679.01 |
| 2012/0185203 A1 * | 7/2012 | Tanaka | 702/141 |
| 2012/0213136 A1 | 8/2012 | Woo et al. | |
| 2012/0214417 A1 | 8/2012 | Woo et al. | |

(Continued)

OTHER PUBLICATIONS

Jason Cipriani, Review: Belkin Wemo Switch and Motion, http://www.wired.com/2013/03/belkin-wemo/, Mar. 12, 2013.

*Primary Examiner* — Thomas Lee
*Assistant Examiner* — Santosh R Poudel
(74) *Attorney, Agent, or Firm* — McDonnell Boehnen Hulbert & Berghoff LLP

(57) ABSTRACT

A data processing device may receive, from an application running on the data processing device, an indication that one or more sensors may be associated with a user input for the application. Based on sensing information collected from the one or more sensors, a characteristic of the user input may be determined by the data processing device. The data processing device may refrain from entering a sleep mode if the characteristic of the user input matches a specific characteristic condition specified by the application. The data processing device may allow entering the sleep mode if the characteristic of the user input does not match the specific characteristic condition for a specific timeout period specified by the application. The data processing device may receive the indication, information on the specific characteristic condition and/or information on the specific timeout period via invoking, by the application, one or more application programming interfaces (APIs).

18 Claims, 6 Drawing Sheets

(56) References Cited

U.S. PATENT DOCUMENTS

| | | | |
|---|---|---|---|
| 2012/0235790 A1* | 9/2012 | Zhao et al. | 340/5.83 |
| 2012/0280905 A1 | 11/2012 | Vonog et al. | |
| 2012/0288126 A1* | 11/2012 | Karkkainen | H04R 3/005 381/309 |
| 2013/0156245 A1* | 6/2013 | Dix et al. | 381/353 |
| 2013/0170688 A1* | 7/2013 | Cohen et al. | 381/340 |
| 2013/0222271 A1 | 8/2013 | Alberth et al. | |
| 2013/0238915 A1* | 9/2013 | Kashikar | 713/320 |
| 2013/0294307 A1* | 11/2013 | Johansson et al. | 370/311 |
| 2014/0215246 A1* | 7/2014 | Lee | G06F 1/3206 713/323 |

* cited by examiner

PREVENTING SLEEP MODE FOR DEVICES BASED ON SENSOR INPUTS

FIELD

Certain embodiments of the disclosure relate to sleep mode of a device. More specifically, certain embodiments of the disclosure relate to a method and system for preventing sleep mode for devices based on sensor inputs.

BACKGROUND

A data processing device, such as, for example, a smart phone, a mobile phone, a tablet and/or other computing device, may enter a sleep mode in instances when there is no touch input on a presence-sensitive screen (e.g., a touchscreen) for a short period of time. In this regard, system level functions of the data processing device may, by default, assume that applications running on the data processing device use touch-input interaction model. A data processing device may comprise various sensors such as, for example, an accelerometer, a compass, a microphone, a global positioning system (GPS) unit, a proximity sensor, etc. One or more of these sensors may be utilized for interaction with an application, for example. In some instances, an interaction with an application utilizing one or more of these sensors may not require a touch input on the presence-sensitive screen. In such instances, the data processing device may enter a sleep mode while a user is interacting with the application via a non-touch input which may be associated with one or more of these sensors.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for preventing sleep mode for devices based on sensor inputs. In various embodiments of the disclosure, a data processing device may comprise one or more applications. The data processing device may receive, from an application running on the data processing device, an indication that one or more sensors may be associated with a user input for the application. Based on sensing information collected from the one or more sensors, a characteristic of the user input may be determined by the data processing device. The data processing device may refrain from entering a sleep mode if the characteristic of the user input matches a specific characteristic condition specified by the application. The data processing device may allow entering the sleep mode if the characteristic of the user input does not match the specific characteristic condition for a specific timeout period specified by the application. In this regard, the data processing device may receive the indication, information on the specific characteristic condition and/or information on the specific timeout period via invoking, by the application, one or more application programming interfaces (APIs).

Various advantages, aspects and novel features of the present disclosure, as well as details of an illustrated embodiment thereof, will be more fully understood from the following description and drawings.

DETAILED DESCRIPTION

Figure 1:
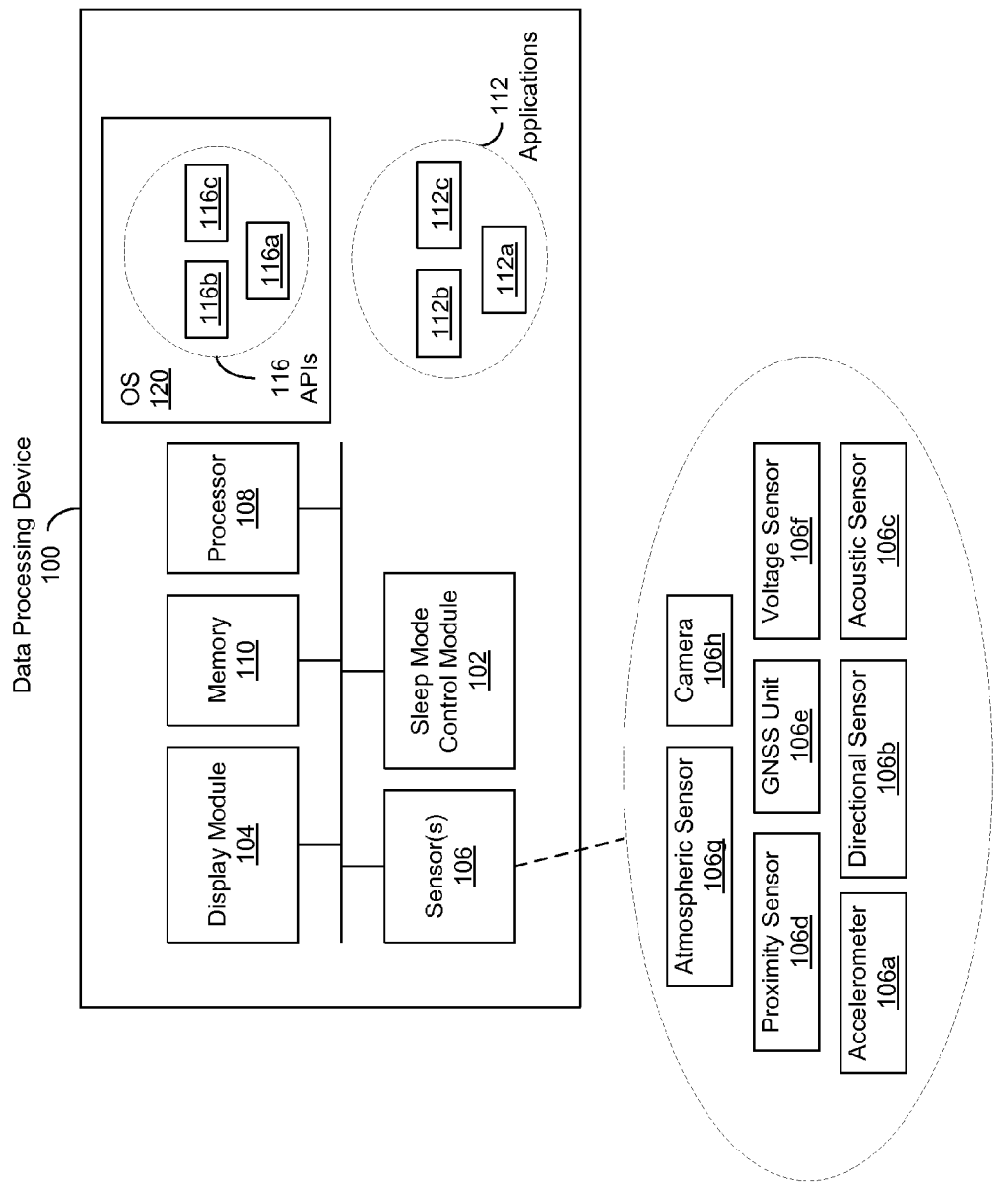
FIG. 1 is a block diagram illustrating an example data processing device, in accordance with an embodiment of the disclosure.

Certain embodiments of the disclosure can be found in a method and system for preventing sleep mode for devices based on sensor inputs. Certain specific details are set forth in the following description and in drawings to provide a thorough understanding of various embodiments of the disclosure. Additional embodiments of the present disclosure may be practiced without several of the details described in the following description.

As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

In various embodiments of the disclosure, a data processing device may be operable to receive, from an application running on the data processing device, an indication that one or more sensors may be associated with a user input for the application. Based on sensing information collected from the one or more sensors, a characteristic of the user input may be determined by the data processing device. The data processing device may be operable to refrain from entering a sleep mode if the characteristic of the user input matches a specific characteristic condition specified by the application. The data processing device may be operable to allow entering the sleep mode if the characteristic of the user input does not match the specific characteristic condition for a specific timeout period specified by the application. In this regard, the data processing device may be operable to receive the indication, information on the specific characteristic condition and/or information on the specific timeout period via invoking, by the application, one or more application programming interfaces (APIs). The one or more sensors may comprise, for example, an accelerometer, a directional sensor, an acoustic sensor, a global navigation satellite system (GNSS) unit, a voltage sensor, a proximity sensor, an atmospheric sensor, a camera and/or other sensors.

In an example embodiment of the disclosure, the specific characteristic condition associated with the accelerometer may comprise a motion acceleration exceeding a specific minimum acceleration value. The specific characteristic condition associated with the directional sensor may comprise, for example, a sensor heading change exceeding a specific minimum change value. The specific characteristic condition associated with the acoustic sensor may comprise, for example, an input volume exceeding a specific minimum volume value that may be within a specific frequency range. The specific characteristic condition associated with the GNSS unit may comprise, for example, a position change exceeding a specific minimum distance. The specific characteristic condition associated with the voltage sensor may comprise, for example, an input voltage change exceeding a specific minimum voltage value.

In an example embodiment of the disclosure, the specific characteristic condition may be determined based on a typical characteristic of the user input for the application while the application is running.

FIG. 1 is a block diagram illustrating an example data processing device, in accordance with an embodiment of the disclosure. Referring to FIG. 1, there is shown a data processing device 100. The data processing device 100 may be, for example, a smart phone, a mobile phone, a tablet and/or other computing device. The data processing device 100 may comprise a processor 108, a memory 110, a display module 104, a sleep mode control module 102 and one or more sensors 106. The data processing device 100 may comprise a plurality of applications 112 running on the data processing device 100, of which applications 112a-112c are illustrated.

The processor 108 may comprise suitable logic, circuitry, interfaces and/or code that may be operable to process data or signals. The processor 108 may be operable to manage and/or control operations of various components or modules in the data processing device 100 such as, for example, the display module 104, the sleep mode control module 102 and/or the sensor(s) 106. The processor 108 may utilize an operating system (OS) 120 that enables the execution of various applications such as the applications 112. In an example embodiment of the disclosure, the operating system (OS) 120 may comprise a plurality of APIs 116, of which APIs 116a-116c are illustrated.

The memory 110 may comprise suitable logic, circuitry, interfaces and/or code that may be operable to store information such as executable instructions and/or data that may be utilized by the processor 108 and/or other modules or components in the data processing device 100. The memory 110 may comprise RAM, ROM, low latency nonvolatile memory such as flash memory and/or other suitable electronic data storage.

The display module 104 may comprise suitable logic, circuitry, interfaces and/or code that may be operable to display or present processed content to a user. The display module 104 may be integrated within or operatively coupled to the data processing device 100, for example. The display module 104 may comprise, for example, a presence-sensitive screen such as a touchscreen or touch-sensitive screen.

The sleep mode control module 102 may comprise suitable logic, circuitry, interfaces and/or code that may be operable to perform sleep mode control functions for the data processing device 100. For example, the sleep mode control module 102 may be operable to allow the data processing device 100 entering a sleep mode in instances when there is no touch input on the presence-sensitive screen at the display module 104 for a certain period of time. In an example embodiment of the disclosure, the sleep mode control module 102 may be operable to control entering of the sleep mode based on sensor inputs (in addition to the touch input).

A sleep mode may refer to a low power mode for a device such as the data processing device 100. A sleep mode may save significantly on electrical consumption compared to leaving a device fully on and, upon resume, allow a user to avoid having to reissue instructions or to wait for a device to reboot. Entering a sleep mode may be equivalent to "pausing" the state of the device, and when restored, the operation continues from the same point, having the same applications and files open. When a device such as the data processing device 100 is in a sleep mode, the device may be in a state of sleep (or "stand-by" or "suspend") or in a state of hibernation. Hibernation is a functionality allowing a device such as the data processing device 100 to be turned off completely while maintaining its state. In this regard, in instances when the data processing device 100 is in a state of sleep, the machine state may be held in a RAM of the memory 110, for example, and the power to unneeded subsystems may be cut, and the RAM may be placed into a minimum power state, just sufficient to retain its data. In instances when the data processing device 100 is in a state of hibernation, the machine state may be saved on a hard disk of the memory 110 (swap partition), for example.

The sensor(s) 106 may comprise suitable logic, circuitry, interfaces and/or code that may be operable to collect sensing information. The sensor(s) 106 may comprise, for example, an accelerometer 106a, a directional sensor 106b, an acoustic sensor 106c, a proximity sensor 106d, a GNSS unit 106e, a voltage sensor 106f, an atmospheric sensor 106g and/or a camera 106h. In this regard, the directional sensor 106b may comprise, for example, a compass and/or a gyroscope. The acoustic sensor 106c may comprise, for example, a microphone. The GNSS unit 106e may comprise, for example, a GPS unit. The atmospheric sensor 106g may comprise, for example a temperature sensor, a humidity sensor and/or a barometric pressure sensor. The camera 106h may comprise, for example, a CMOS camera. In an example embodiment of the disclosure, the collected sensing information may be communicated to the sleep mode control module 102 for controlling entering of a sleep mode.

In operation, one or more applications 112a-112c may be running on the data processing device 100. The sleep mode control module 102 may be operable to receive, from an application such as the application 112a, an indication that one or more sensors 106 may be associated with a user input for the application 112a. In this regard, for example, the application 112a may or may not rely on touch input for a user to interact with the application 112a. Based on sensing information collected from the one or more sensors 106, a characteristic of the user input may be determined by the sleep mode control module 102. The sleep mode control module 102 may be operable to refrain the data processing device 100 from entering a sleep mode if the characteristic of the user input matches a specific characteristic condition specified by the application 112a. The sleep mode control module 102 may be operable to allow the data processing device 100 entering the sleep mode if the characteristic of the user input does not match the specific characteristic condition for a specific timeout period specified by the application 112a. In such instances, the sleep mode control module 102 may be operable to receive the indication, information on the specific characteristic condition and/or information on the specific timeout period via invoking, by the application 112a, one or more APIs 116.

In an example embodiment of the disclosure, one or more parameters of a specific characteristic condition may be set to a value of "none". In such instances, the parameter which is set to "none' may not affect the sleep behavior of the data processing device 100. In addition, a value of a parameter of a specific characteristic condition may be determined, for example, automatically via a tool, based on a typical characteristic of the user input for the application 112a while the application 112a is running.

Figure 2:
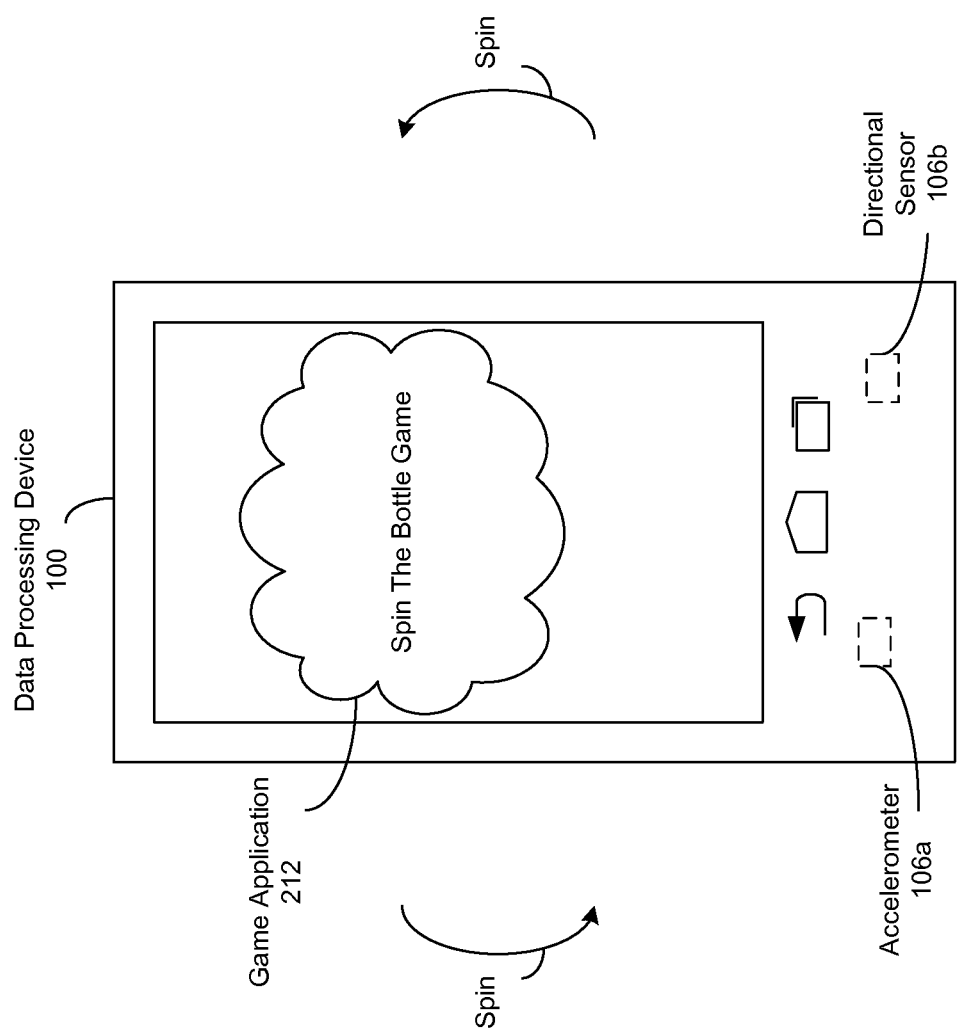
FIG. 2 is a block diagram illustrating an example scenario of preventing a sleep mode based on information provided by an accelerometer and/or a directional sensor, in accordance with an embodiment of the disclosure.

FIG. 2 is a block diagram illustrating an example scenario of preventing a sleep mode based on information provided by an accelerometer and/or a directional sensor, in accordance with an embodiment of the disclosure. This scenario is provided by way of example illustration and not of limitation. Referring to FIG. 2, there is shown the data process device 100. The data processing device 100 may comprise a game application 212 running on the data processing device 100, for example. The data processing device 100 may be as described with respect to FIG. 1, for example.

In an example operation, the game application 212 may require a user to spin the data processing device 100 on a table top. The sleep mode control module 102 may receive, from the game application 212, an indication that an accelerometer 106a and a directional sensor (e.g., a compass) 106b may be associated with a user input for the game. The game application 212 may specify specific characteristic conditions associated with the accelerometer 106a and the directional sensor (the compass) 106b. The game application 212 may also specify specific timeout periods (e.g., "spin_timeout" seconds) corresponding to the specific characteristic conditions. In this regard, the specific characteristic condition associated with the accelerometer 106a may comprise, for example, a motion acceleration exceeding a specific minimum acceleration value (e.g., "min_accel" meters per second per second). The specific characteristic condition associated with the directional sensor (the compass) 106b may comprise, for example, a sensor heading (compass heading) change exceeding a specific minimum change value (e.g., "min_rotat" degrees). In this regard, for example, the specific minimum acceleration value may be determined or specified, automatically via a tool, based on learning a typical acceleration value or range while the game is being played.

The sleep mode control module 102 may be operable to allow the data processing device 100 entering a sleep mode, for example, if (1) the accelerometer 106a does not detect an acceleration exceeding the specific minimum acceleration value ("min_accel" meters per second per second) for the specific timeout period ("spin_timeout" seconds) and (2) the heading of the directional sensor (the compass) 106b does not change exceed or beyond the specific minimum change value ("min_rotat" degrees) for the specific timeout period ("spin_timeout" seconds).

Figure 3:
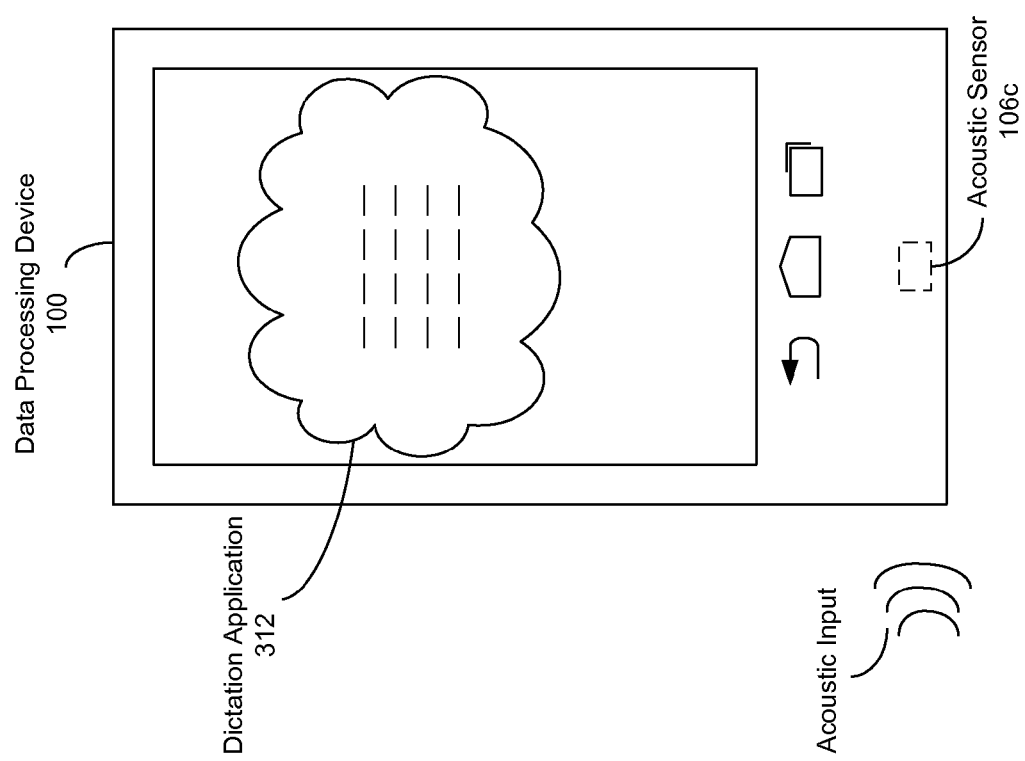
FIG. 3 is a block diagram illustrating an example scenario of preventing a sleep mode based on information provided by an acoustic sensor, in accordance with an embodiment of the disclosure.

FIG. 3 is a block diagram illustrating an example scenario of preventing a sleep mode based on information provided by an acoustic sensor, in accordance with an embodiment of the disclosure. This scenario is provided by way of example illustration and not of limitation. Referring to FIG. 3, there is shown the data process device 100. The data processing device 100 may comprise a dictation application 312 running on the data processing device 100, for example. The data processing device 100 may be as described with respect to FIG. 1, for example.

In an example operation, the dictation application 312 may require a user to talk or read to the data processing device 100. The sleep mode control module 102 may receive, from the dictation application 312, an indication that an acoustic sensor (e.g., a microphone) 106c may be associated with a user input for the dictation application 312. In this regard, the processor 108 in the data processing device 100 may be operable to listen, via the acoustic sensor (the microphone) 106c, what the user tells and cause display of a transcription on the screen at the display module 104 as the user talks. The dictation application 312 may specify a specific characteristic condition associated with the acoustic sensor (the microphone) 106c. The dictation application 312 may also specify a specific timeout period (e.g., "dict_timeout" seconds) corresponding to the specific characteristic condition. In this regard, the specific characteristic condition associated with the acoustic sensor (the microphone) 106c may comprise, for example, an input volume exceeding a specific minimum volume value (e.g., "min_volume" decibels) that is within a specific frequency range (e.g., "min-freq" Hz to "max-freq" Hz).

The sleep mode control module 102 may be operable to allow the data processing device 100 entering a sleep mode, for example, if the acoustic sensor (the microphone) 106c detects that the input volume stays below the specific minimum volume value (min_volume" decibels) at a frequency outside the specific frequency range ("min-freq" Hz to "max-freq" Hz) for the specific timeout period ("dict_timeout" seconds). For example, the data processing device 100 may enter the sleep mode in instances when the input volume of the acoustic sensor (the microphone) 106c stays below 2 decibels (dB) at a frequency above 200 Hz for 120 seconds.

Figure 4:
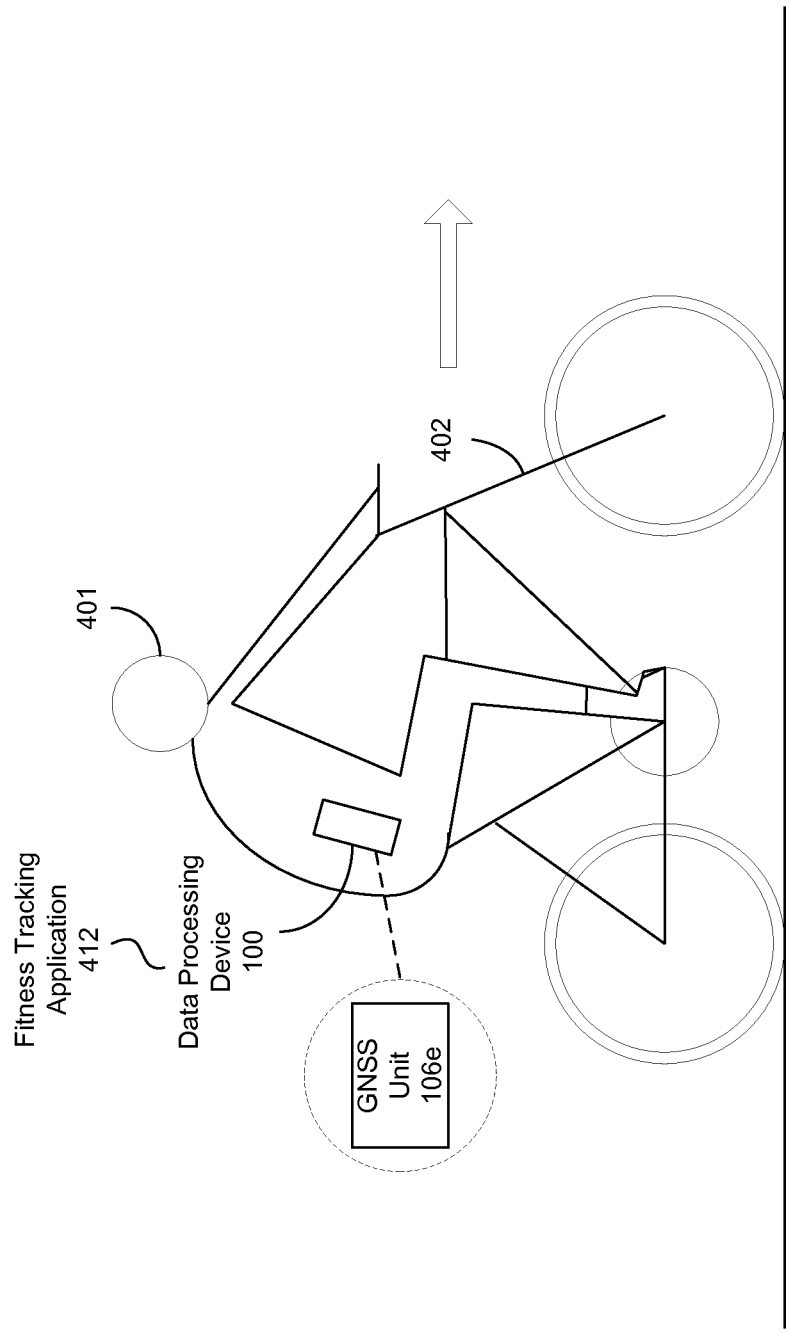
FIG. 4 is a block diagram illustrating an example scenario of preventing a sleep mode based on information provided by a GNSS unit, in accordance with an embodiment of the disclosure.

FIG. 4 is a block diagram illustrating an example scenario of preventing a sleep mode based on information provided by a GNSS unit, in accordance with an embodiment of the disclosure. This scenario is provided by way of example illustration and not of limitation. Referring to FIG. 4, there is shown a user 401 riding on a bicycle 402 while carrying the data process device 100. The data processing device 100 may comprise a fitness tracking application 412 running on the data processing device 100, for example. The data processing device 100 may be as described with respect to FIG. 1, for example.

In an example operation, the fitness tracking application 412 may require the user 401 to collect movement data (e.g., distance, speed, elevation, etc.) using the data processing device 100. The sleep mode control module 102 may receive, from the fitness tracking application 412, an indication that a GNSS unit (e.g., a GPS unit) 106e may be associated with a user input for the fitness tracking application 412. In this regard, the movement data collected by the GNSS unit (the GPS unit) 106e may be analyzed or processed by the fitness tracking application 412, for example. In other instances, the collected movement data may be communicated, by the data processing device 100, to a data center for analysis or processing, for example. The fitness tracking application 412 may specify a specific characteristic condition associated with the GNSS unit (the GPS unit) 106e. The fitness tracking application 412 may also specify a specific timeout period (e.g., "GNSS_timeout" seconds) corresponding to the specific characteristic condition. In this regard, the specific characteristic condition associated with the GNSS unit (the GPS unit) 106e may comprise, for example, a position change exceeding a specific minimum distance (e.g., "min_dist" meters).

The sleep mode control module 102 may be operable to allow the data processing device 100 entering a sleep mode, for example, if the GNSS unit (the GPS unit) 106e does not measure a change in position of the specific minimum distance ("min_dist" meters) for the specific timeout period ("GNSS_timeout" seconds).

Figure 5:
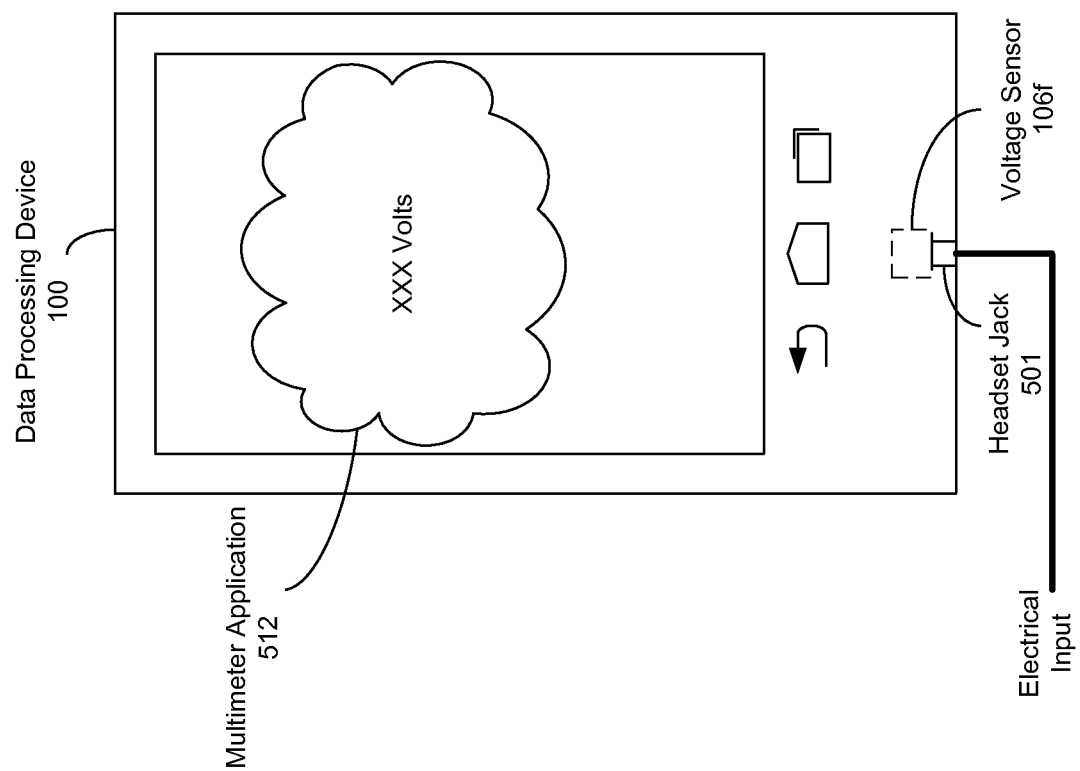
FIG. 5 is a block diagram illustrating an example scenario of preventing a sleep mode based on information provided by a voltage sensor, in accordance with an embodiment of the disclosure.

FIG. 5 is a block diagram illustrating an example scenario of preventing a sleep mode based on information provided by a voltage sensor, in accordance with an embodiment of the disclosure. This scenario is provided by way of example illustration and not of limitation. Referring to FIG. 5, there is shown the data process device 100. The data processing device 100 may comprise a multimeter application 512 running on the data processing device 100, for example. The data processing device 100 may be as described with respect to FIG. 1, for example.

In an example operation, the multimeter application 512 may require a user to provide an electrical input at a headset jack 501 of the data processing device 100. The sleep mode control module 102 may receive, from the multimeter application 512, an indication that a voltage sensor 106f may be associated with a user input for the multimeter application 512. In this regard, the processor 108 in the data processing device 100 may be operable to detect, via the voltage sensor 106f, a voltage of the electrical input at the headset jack 501, and cause display of a voltage measurement on the screen at the display module 104. The multimeter application 512 may specify a specific characteristic condition associated with the voltage sensor 106f. The multimeter application 512 may also specify a specific timeout period (e.g., "meter_timeout" seconds) corresponding to the specific characteristic condition. In this regard, the specific characteristic condition associated with the voltage sensor 106f may comprise, for example, an input voltage change exceeding a specific minimum voltage value (e.g., "min_voltage" volts).

The sleep mode control module 102 may be operable to allow the data processing device 100 entering a sleep mode, for example, if a change in the input voltage detected by the voltage sensor 106f does not exceed the specific minimum voltage value ("min_voltage" volts) for the specific timeout period ("meter_timeout" seconds).

Figure 6:
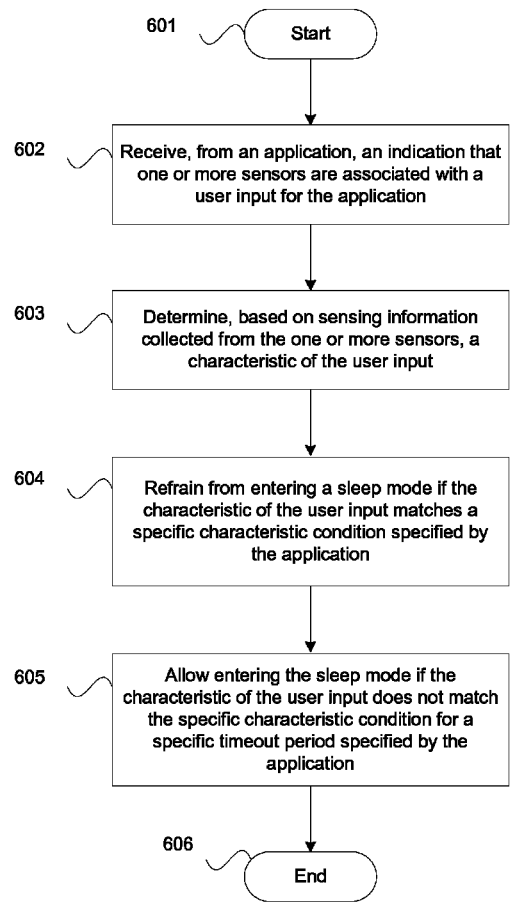
FIG. 6 is a flow chart illustrating example steps for preventing sleep mode for devices based on sensor inputs, in accordance with an embodiment of the disclosure.

FIG. 6 is a flow chart illustrating example steps for preventing sleep mode for devices based on sensor inputs, in accordance with an embodiment of the disclosure. Referring to FIG. 6, the example steps start at step 601. In step 602, the sleep mode control module 102 in the data processing device 100 may be operable to receive, from an application such as the application 112a running on the data processing device 100, an indication that one or more sensors 106 may be associated with a user input for the application 112a. In step 603, the sleep mode control module 102 may be operable to determine, based on sensing information collected from the one or more sensors 106, a characteristic of the user input. In step 604, the sleep mode control module 102 may be operable to refrain the data processing device 100 from entering a sleep mode if the characteristic of the user input matches a specific characteristic condition specified by the application. In step 605, the sleep mode control module 102 may be operable to allow the data processing device 100 entering the sleep mode if the characteristic of the user input does not match the specific characteristic condition for a specific timeout period specified by the application. The example steps may proceed to the end step 606.

In various embodiments of the disclosure, a sleep mode control module 102 in a data processing device 100 may be operable to receive, from an application 112a running on the data processing device 100, an indication that one or more sensors 106 may be associated with a user input for the application 112a. Based on sensing information collected from the one or more sensors 106, a characteristic of the user input may be determined by the sleep mode control module 102. The sleep mode control module 102 may be operable to refrain the data processing device 100 from entering a sleep mode if the characteristic of the user input matches a specific characteristic condition specified by the application 112a. The sleep mode control module 102 may be operable to allow the data processing device 100 entering the sleep mode if the characteristic of the user input does not match the specific characteristic condition for a specific timeout period specified by the application 112a. In this regard, the sleep mode control module 102 may be operable to receive the indication, information on the specific characteristic condition and/or information on the specific timeout period via invoking, by the application 112a, one or more APIs 116. The one or more sensors 106 may comprise, for example, an accelerometer 106a, a directional sensor (e.g., a compass and/or a gyroscope) 106b, an acoustic sensor (e.g., a microphone) 106c, a GNSS unit (e.g., a GPS unit) 106e, a voltage sensor 106f, a proximity sensor 106d, an atmospheric sensor (e.g., a temperature sensor, a humidity sensor and/or a barometric pressure sensor) 106g, a camera (e.g., a CMOS camera) 106h and/or other sensors.

The specific characteristic condition associated with the accelerometer 106a may comprise, for example, a motion acceleration exceeding a specific minimum acceleration value (e.g., "min_accel" meters per second per second). The specific characteristic condition associated with the directional sensor 106b may comprise, for example, a sensor heading change exceeding a specific minimum change value (e.g., "min_rotat" degrees). The specific characteristic condition associated with the acoustic sensor 106c may comprise, for example, an input volume exceeding a specific minimum volume value (e.g., "min_volume" decibels) that may be within a specific frequency range (e.g., "min-freq" Hz to "max-freq" Hz). The specific characteristic condition associated with the GNSS unit 106e may comprise, for example, a position change exceeding a specific minimum distance (e.g., "min_dist" meters). The specific characteristic condition associated with the voltage sensor 106f may comprise, for example, an input voltage change exceeding a specific minimum voltage value (e.g., "min_voltage" volts).

The specific characteristic condition may be determined or specified, for example, automatically via a tool, based on a typical characteristic of the user input for the application 112a while the application 112a is running.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for preventing sleep mode for devices based on sensor inputs.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a data processing device having a sleep mode control configuration based on at least input related to a particular sensor:
   receiving, from a plurality of applications running on the data processing device, respective indications that one or more sensors other than the particular sensor are associated with respective user inputs for the plurality of applications;
   responsive to receiving the respective indications from the plurality of applications, modifying the sleep mode control configuration such that the sleep mode control configuration is based on at least input related to the one or more sensors indicated by the plurality of applications;
   determining, based on sensing information collected from the one or more sensors, a characteristic of a user input for an application of the plurality of applications;
   learning characteristics of the user input while the application is running;
   determining, based on the learned characteristics, one or more specific minimum values pertaining to measurements indicated by the one or more sensors;
   determining a specific characteristic of the user input for the application based on the determined one or more specific minimum values;
   refraining from entering a sleep mode if the characteristic of the user input matches a characteristic condition specified by the application, wherein the characteristic condition is based on the determined specific characteristic of the user input; and
   allowing entering the sleep mode if the characteristic of the user input does not match the characteristic condition for a specific timeout period specified by the application.

2. The method according to claim 1, comprising receiving the respective indications, information on the characteristic condition and/or information on the specific timeout period via invoking, by the plurality of applications, one or more application programming interfaces (APIs).

3. The method according to claim 1, wherein the one or more sensors comprise an accelerometer, a directional sensor, an acoustic sensor, a global navigation satellite system (GNSS) unit, a voltage sensor, a proximity sensor, an atmospheric sensor, a camera and/or other sensors.

4. The method according to claim 3, wherein the characteristic condition associated with the accelerometer comprises a motion acceleration exceeding a specific minimum acceleration value, wherein the determined one or more specific minimum values include the specific minimum acceleration value.

5. The method according to claim 3, wherein the characteristic condition associated with the directional sensor comprises a sensor heading change exceeding a specific minimum change value, wherein the determined one or more specific minimum values include the specific minimum change value.

6. The method according to claim 3, wherein the characteristic condition associated with the acoustic sensor comprises an input volume exceeding a specific minimum volume value that is within a specific frequency range, wherein the determined one or more specific minimum values include the specific minimum volume value.

7. The method according to claim 3, wherein the characteristic condition associated with the GNSS unit comprises a position change exceeding a specific minimum distance, wherein the determined one or more specific minimum values include the specific minimum distance.

8. The method according to claim 3, wherein the characteristic condition associated with the voltage sensor comprises an input voltage change exceeding a specific minimum voltage value, wherein the determined one or more specific minimum values include the specific minimum voltage value.

9. A system, comprising:
   a data processing device having a sleep mode control configuration based on at least input related to a particular sensor, wherein the data processing device is operable to:
   receive, from a plurality of applications running on the data processing device, respective indications that one or more sensors other than the particular sensor are associated with respective user inputs for the plurality of applications;
   responsive to receiving the respective indications from the plurality of applications, modify the sleep mode control configuration such that the sleep mode control configuration is based on at least input related to the one or more sensors indicated by the plurality of applications;
   determine, based on sensing information collected from the one or more sensors, a characteristic of a user input for an application of the plurality of applications;
   learn characteristics of the user input while the application is running;
   determine, based on the learned characteristics, one or more specific minimum values pertaining to measurements indicated by the one or more sensors;
   determine a specific characteristic of the user input for the application based on the determined one or more specific minimum values;
   refrain from entering a sleep mode if the characteristic of the user input matches a characteristic condition specified by the application, wherein the characteristic condition is based on the determined specific characteristic of the user input; and allow entering the sleep mode if the characteristic of the user input does not match the characteristic condition for a specific timeout period specified by the application.

10. The system according to claim 9, wherein the data processing device is operable to receive the respective indications, information on the characteristic condition and/or information on the specific timeout period via invoking, by the plurality of applications, one or more application programming interfaces (APIs).

11. The system according to claim 9, wherein the one or more sensors comprise an accelerometer, a directional sensor, an acoustic sensor, a global navigation satellite system (GNSS) unit, a voltage sensor, a proximity sensor, an atmospheric sensor, a camera and/or other sensors.

12. The system according to claim 11, wherein the characteristic condition associated with the accelerometer comprises a motion acceleration exceeding a specific minimum acceleration value.

13. The system according to claim 11, wherein the characteristic condition associated with the directional sensor comprises a sensor heading change exceeding a specific minimum change value, wherein the determined one or more specific minimum values include the specific change value.

14. The system according to claim 11, wherein the characteristic condition associated with the acoustic sensor comprises an input volume exceeding a specific minimum volume value that is within a specific frequency range, wherein the determined one or more specific minimum values include the specific minimum volume value.

15. The system according to claim 11, wherein the characteristic condition associated with the GNSS unit comprises a position change exceeding a specific minimum distance, wherein the determined one or more specific minimum values include the specific minimum distance.

16. The system according to claim 11, wherein the characteristic condition associated with the voltage sensor comprises an input voltage change exceeding a specific minimum voltage value, wherein the determined one or more specific minimum values include the specific minimum voltage value.

17. A method, comprising:
in a data processing device having a sleep mode control configuration based on at least input related to a particular sensor:
receiving, from a plurality of applications running on the data processing device, respective indications that one or more sensors other than the particular sensor are associated with respective user inputs for the plurality of applications;
responsive to receiving the respective indications from the plurality of applications, modifying the sleep mode control configuration such that the sleep mode control configuration is based on at least input related to the one or more sensors indicated by the plurality of applications;
determining, based on sensing information collected from the one or more sensors, a characteristic of a user input for an application of the plurality of applications;
learning characteristics of the user input while the application is running;
determining, based on the learned characteristics, one or more specific minimum values pertaining to measurements indicated by the one or more sensors;
determining a specific characteristic of the user input for the application based on the determined one or more specific minimum values;
refraining from entering a sleep mode if the characteristic of the user input matches a characteristic condition specified by the application, wherein the characteristic condition is based on the determined specific characteristic of the user input; and
allowing entering the sleep mode if the characteristic of the user input does not match the characteristic condition for a specific timeout period specified by the application, wherein the data processing device receives the respective indications, information on the characteristic condition and/or information on the specific timeout period via invoking, by the plurality of applications, one or more application programming interfaces (APIs).

18. The method according to claim 17, wherein the one or more sensors comprise an accelerometer, a directional sensor, an acoustic sensor, a global navigation satellite system (GNSS) unit, a voltage sensor, a proximity sensor, an atmospheric sensor, a camera and/or other sensors.

* * * * *